United States Patent
Janson et al.

(10) Patent No.: US 11,772,513 B1
(45) Date of Patent: Oct. 3, 2023

(54) SMART BATTERY COMMUNICATION SYSTEM FOR VEHICLE

(71) Applicants: Paul M Janson, Northridge, CA (US); Lai Joseph, Rancho Palo Verde, CA (US)

(72) Inventors: Paul M Janson, Northridge, CA (US); Lai Joseph, Rancho Palo Verde, CA (US)

(*) Notice: Subject to any disclaimer, the term of this patent is extended or adjusted under 35 U.S.C. 154(b) by 0 days.

(21) Appl. No.: 17/548,500

(22) Filed: Dec. 11, 2021

Related U.S. Application Data

(60) Provisional application No. 63/259,569, filed on Jul. 26, 2021.

(51) Int. Cl.
| | | |
|---|---|---|
| *B60L 58/16* | (2019.01) | |
| *B60L 58/12* | (2019.01) | |
| *B60L 3/04* | (2006.01) | |
| *B60R 25/045* | (2013.01) | |
| *H01M 10/42* | (2006.01) | |

(52) U.S. Cl.
CPC ............ *B60L 58/16* (2019.02); *B60L 3/04* (2013.01); *B60L 58/12* (2019.02); *B60R 25/045* (2013.01); *H01M 10/4257* (2013.01); *B60L 2200/10* (2013.01); *B60L 2200/32* (2013.01); *B60L 2240/547* (2013.01); *B60L 2240/549* (2013.01); *H01M 2010/4278* (2013.01); *H01M 2220/20* (2013.01)

(58) Field of Classification Search
CPC .. B60L 58/16; B60L 58/12; B60L 3/04; B60L 2200/10; B60L 2200/32; B60L 2240/547; B60L 2240/549; B60R 25/045; H01M 10/4257; H01M 2010/4278; H01M 2220/20
See application file for complete search history.

(56) References Cited

U.S. PATENT DOCUMENTS

| | | | | |
|---|---|---|---|---|
| 4,958,084 A | * | 9/1990 | Carlo | ............ B60R 25/04 340/428 |
| 5,965,954 A | * | 10/1999 | Johnson | ............ B60R 25/04 307/10.3 |
| 9,559,530 B2 | * | 1/2017 | Lee | ............ H02J 13/00002 |

(Continued)

OTHER PUBLICATIONS

Vincent et al., T. Development of Smart Battery Cell Monitoring System and Characterization on a Small-Module Through In-Vehicle Power Line Communication, Google Scholar, IEEE Access, vol. 9, Dec. 2020, p. 220658-220671. (Year: 2020).*

"Battery Management System", article, Oct. 30, 2021, pp. 1 to 6, https://en.wikipedia.org/wiki/battery_management_system, San Francisco (a battery pack having an external comm. data bus for managing a rechargeable battery by monitoring state, environment, etc.such as voltage, temperature, current; p.s 1,2).

(Continued)

*Primary Examiner* — Russell Frejd
(74) *Attorney, Agent, or Firm* — Stan Collier

(57) ABSTRACT

A smart battery communication system for a vehicle battery comprises a container for the smart battery communication system mounted to a vehicle battery and terminals for receiving power therefrom; a micro-controller is mounted in the container and has a microprocessor therein; one or more sensor modules are in the container, where each sensor module is capable of a specific function such as monitoring battery health; and one or more interfaces in the container connected to the controller and the one or more sensor modules, further including one or more wireless modems for communicating therefrom. The Smart Battery Communication System can function in a network of other like systems.

18 Claims, 10 Drawing Sheets

(56) References Cited

U.S. PATENT DOCUMENTS

| | | | | |
|---|---|---|---|---|
| 2009/0275362 | A1* | 11/2009 | Tieman | H04M 1/72415 455/556.1 |
| 2011/0029157 | A1* | 2/2011 | Muzaffer | B60L 58/16 701/2 |
| 2011/0106280 | A1* | 5/2011 | Zeier | H01M 10/425 700/90 |
| 2015/0357692 | A1* | 12/2015 | Piggott | H02J 7/0068 29/623.2 |
| 2016/0380814 | A1* | 12/2016 | Peeters | H04L 41/344 370/255 |
| 2017/0149255 | A1* | 5/2017 | Garcia-Acosta | H02J 7/0047 |
| 2018/0364284 | A1* | 12/2018 | Kim | G01R 19/16542 |
| 2019/0252745 | A1* | 8/2019 | Piggott | H05K 3/325 |
| 2020/0406860 | A1* | 12/2020 | Mai | B60R 25/31 |
| 2021/0331639 | A1* | 10/2021 | Valdevit | B60R 16/03 |
| 2021/0349465 | A1* | 11/2021 | Gillett | B62J 99/00 |
| 2022/0044504 | A1* | 2/2022 | Consolacion | G07C 9/00571 |

OTHER PUBLICATIONS

"Battery sensor: how it works, problems, checking, battery replacement", article, Oct. 30, 2021, pp. 1 to 7, https://www.samarines.com/glossary/battery-sensor.html, Internet. (battery sensor installed on the outside of battery and to the negative terminal or positive and it checks on current, voltage, charge and temp., p1).

"Microcontroller", Article, Nov. 15, 2021, pp. 1 to 14, https://en.lwikipedia.org/wiki/Microcontroller, San Francisco. (p. 6, other features like reading sensors, p. 7 high integration, other serial communications interfaces).

"Smartphones", "Hardware", Article, Nov. 27, 2021, https://en.wikipedia.org/wiki/Smartphones, pp. 18 to 25, San Francisco. (See p. 18, types of chips, p. 21, sensors, and common sensors such accelerometers, light sensor, heart rate sensor, humidity sensor).

"Vehicle-to-everything", Article, Dec. 3, 2021, https://en.wikipedia.org/vehicle-to-everything, pp. 1 to 10, discusses vehicle communication and other entities such as V2V) San Francisco.

* cited by examiner

FIG. 7
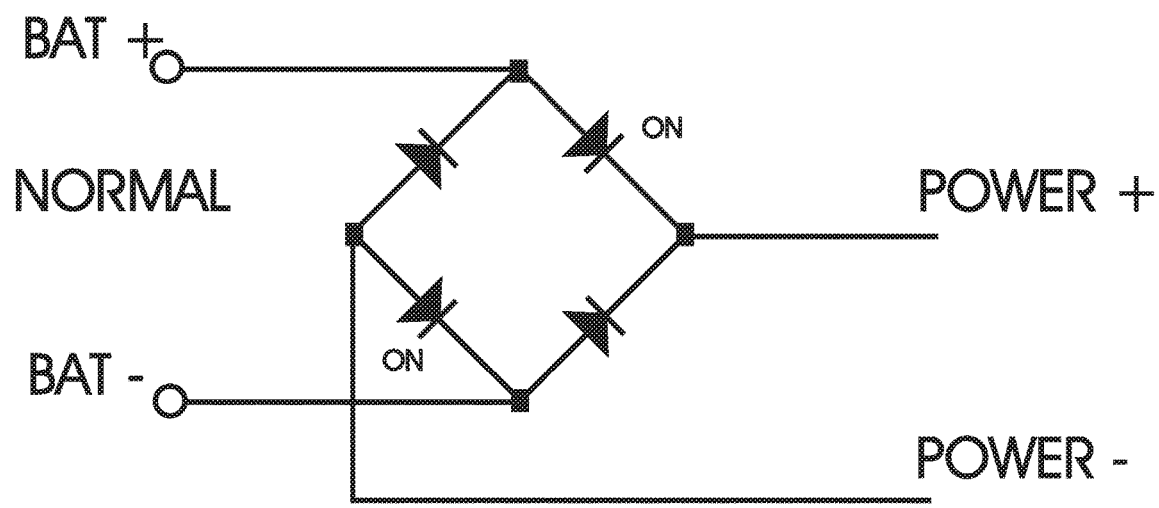
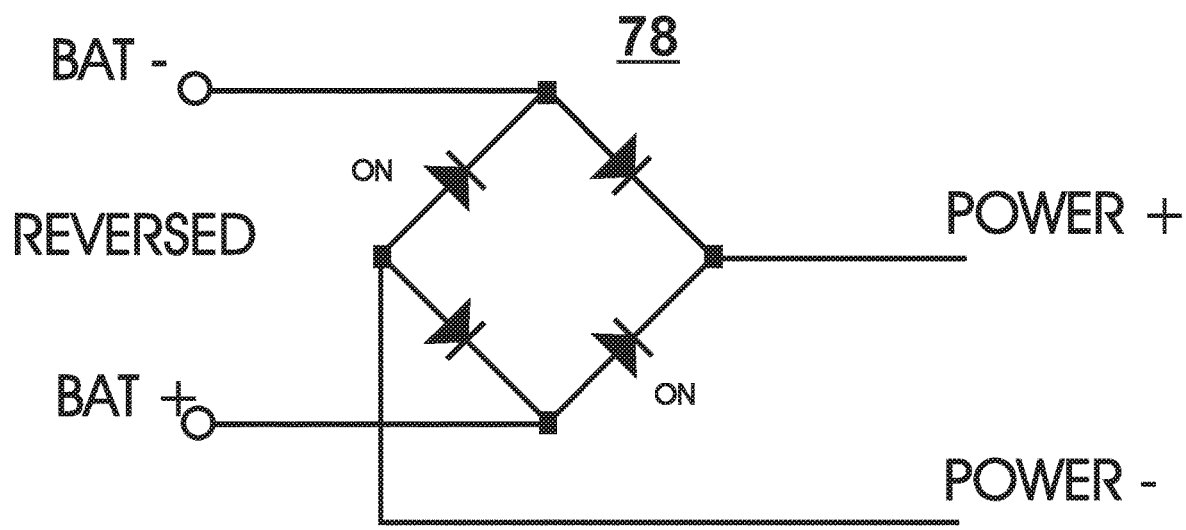

FIG. 9
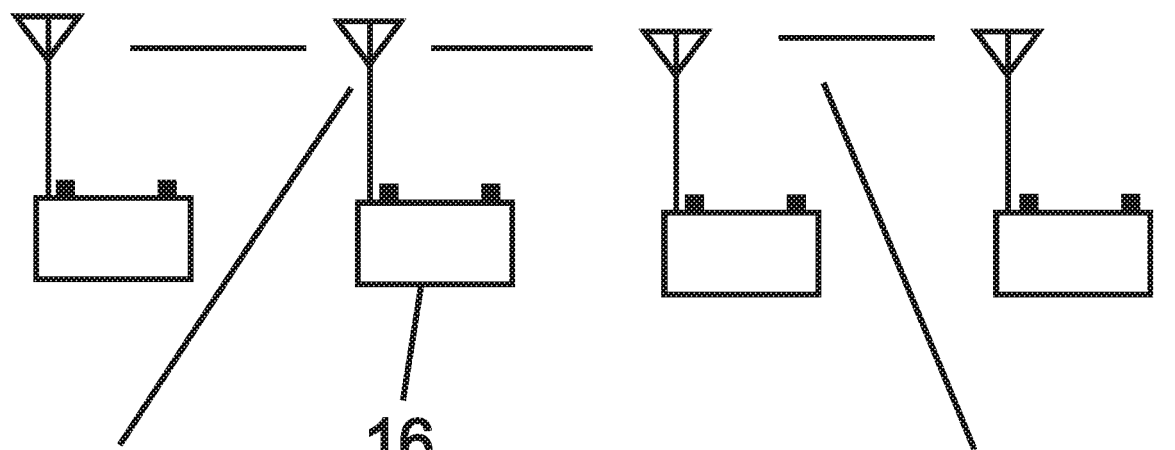
IN THE AIR
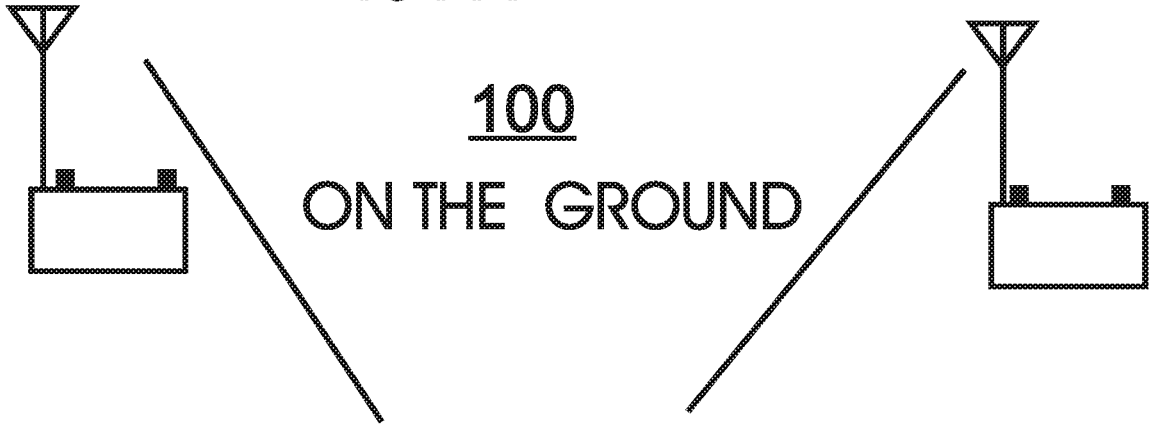
16 . . .
100
ON THE GROUND
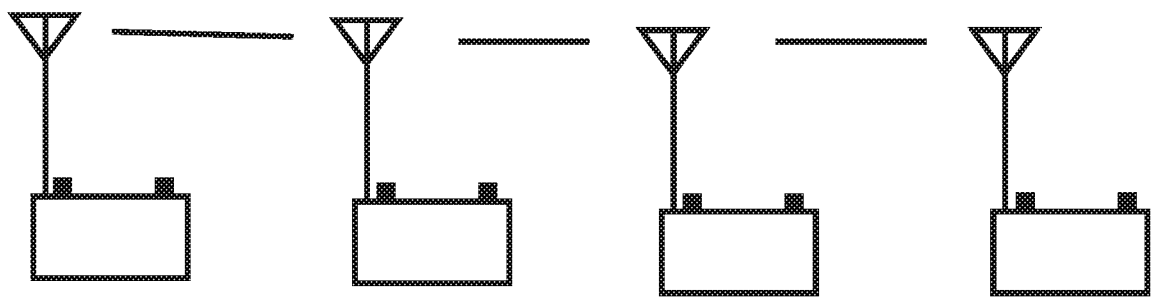
OVER THE WATER

SMART BATTERY COMMUNICATION SYSTEM FOR VEHICLE

CROSS REFERENCES TO RELATED APPLICATIONS

The present application claims the benefit of the provisional patent application 63/259,569, filed Jul. 26, 2021, by Paul Janson and Joseph Lai, entitled, "Smart Car Battery with Sensors".

REFERENCE TO FEDERALLY SPONSORED RESEARCH OR DEVELOPMENT

NA

REFERENCE TO JOINT RESEARCH AGREEMENTS

NA

REFERENCE TO SEQUENCE LISTING

NA

BACKGROUND OF THE INVENTION

Field of the Invention

The present invention relates generally to vehicles, and, in particular, relates to car batteries, and, in greater particularity, relates to car batteries with modules thereon to communicate wirelessly about internal and external conditions.

Description of the Prior Art

Vehicle owners at times are confronted with their car not wanting to start, for example. It can be a frustrating and possibly dangerous event depending on where it happens such as a busy highway or in a very remote location. When alternators are working properly a battery may not have much life left in it, but the alternator warning light will not come on if the battery is about to die. Therefore, most if not all vehicle owners will agree that it would be advantageous to be able to buy off the shelf a car battery that will self-diagnose and report its condition to the vehicle owner through an alert App on ones smartphone that the battery is in jeopardy of dying and leaving a motorist stranded. In the past a vehicle owner would have to drive to an auto shop and have a technician hookup terminals and test the battery. Most vehicle owners never make a habit of doing this and it's only when there is trouble and they need a jumpstart to get to the repair shop afterwards. This problem has been addressed by a battery sensor as described in an article entitled, "Battery sensor: how it works, problems, checking, battery replacement." see website, https://www.samains-.com/glossary/battery-sensor.html, updated Aug. 1, 2021; and also Wikipedia, article entitled, "Battery management system," from https://en.wikipedia.org/w/index/.php?title=Battery management system&oldid=1-51773739, dated 25 Oct. 2021. Also see, Wikipedia article, "Microcontroller" 14 pages, dated Nov. 6, 2021. A discussion of smartphone hardware is noted in "Smartphone", "Hardware" in Wikipedia, pages 18 to 26, of Nov. 27, 2021, wherein it shows a smartphone with numerous IC chips such as wireless communication chips for Wi-Fi, Bluetooth, and GPS receiver, for example. And further sensors in smartphones are discussed on pages 21 to 22, including such as accelerometers, gyroscope, light sensor, barometer. Clearly, the sensor modules noted herein would be included in the smart battery. The history of working on vehicle-to-vehicle communication projects to increase safety, reduce accidents and driver assistance can be traced back to the 1970s with projects such as the US Electronic Road Guidance System (ERGS) and Japan's CACS. Most milestones in the history of vehicle networks originate from the United States, Europe, and Japan. See Wikipedia article "Vehicle-to-everything", pages 10, 1213/2021. All references are incorporated herein as to their teachings.

Accordingly, there is a need for a vehicle system for managing various conditions and communicating these conditions to the vehicle, a smartphone or other module.

SUMMARY OF THE INVENTION

A smart battery communication system for a vehicle battery comprises a sealed container for the smart battery communication system mounted to a vehicle battery and terminals for receiving power therefrom. A micro-controller is mounted in the container and has a microprocessor therein with one or more sensor modules in the container, each sensor module being capable of a specific function such as monitoring battery health. The controller and the one or more sensor modules further including one or more wireless modems for communicating therefrom. The smart battery communication system may act in a network among other systems.

It is an object of the present invention to provide a wireless vehicle communications system being mounted on or in a vehicle battery for providing security and safety to the operator/owner;

It is another object of the present invention to provide a wireless communication system for a vehicle, and, in particular, a car;

It is a further object of the present invention to provide a wireless communications system receiving power from the vehicle battery and having numerous sensor modules therein, and in particular, a battery health module;

It is still a further object of the present invention to provide wireless communication system that sends relevant information to the operator/owner via Bluetooth to a smartphone with an application (app) therein that shows relevant communications and alerts to the operator/owner;

It is still another object of the present invention to provide a wireless communication system for a vehicle that communicates with external modules such as a smartphone, cell phone tower, satellite, other vehicles; and It is still another object of the present invention to provide a communications system for a vehicle mounted to the vehicle battery and in a sealed container without further external wires to the vehicle to facilitate mounting thereto.

These and other objects, features, and advantages of the present invention will become more readily apparent from the attached drawings and the detailed description of the preferred embodiments, which follow.

BRIEF DESCRIPTION OF THE DRAWINGS

FIG. 7 shows a rectifier section in the electronic section of the present invention;

FIG. 9 shows the system forming a network from batteries in the air, on the ground and over water.

Like reference numerals refer to like parts throughout the several views of the drawings.

DETAILED DESCRIPTION OF THE PREFERRED EMBODIMENTS

Figure 1:
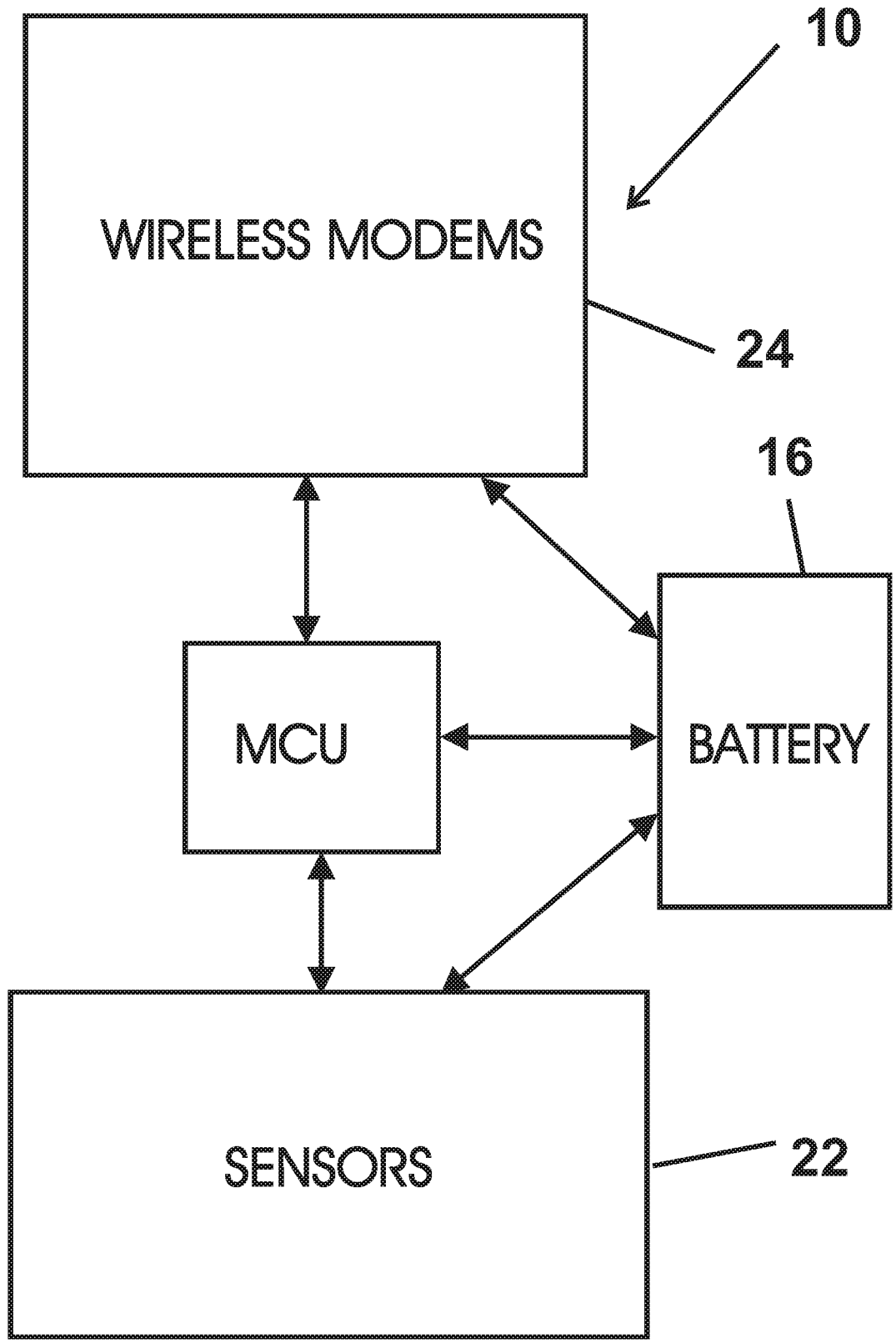
FIG. 1 is a partial schematic of the smart battery communication system of the present invention.
Figure 4:
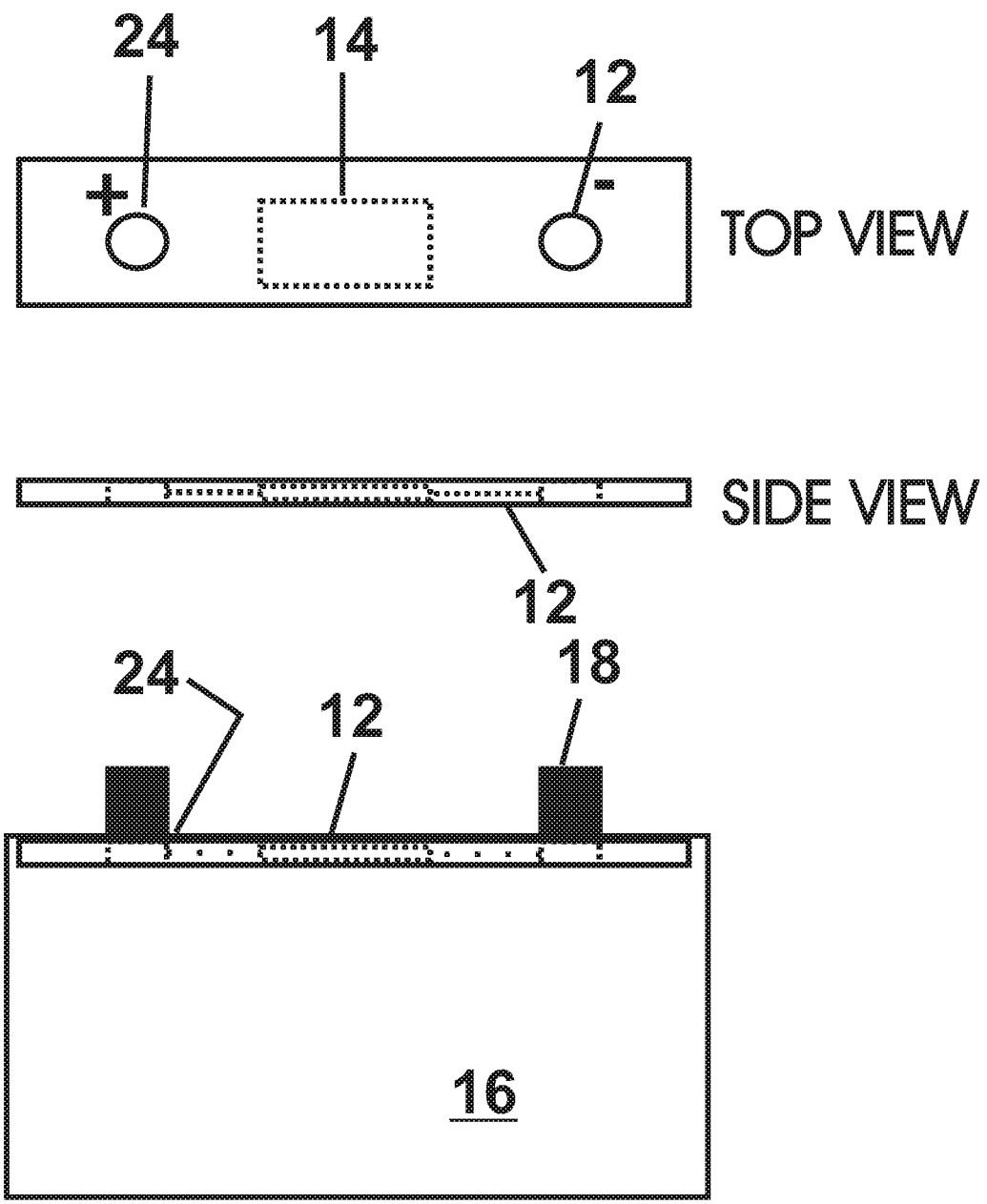
FIG. 4 shows the container, top and side views, mounted on inside of a standard car battery.
Figure 5:
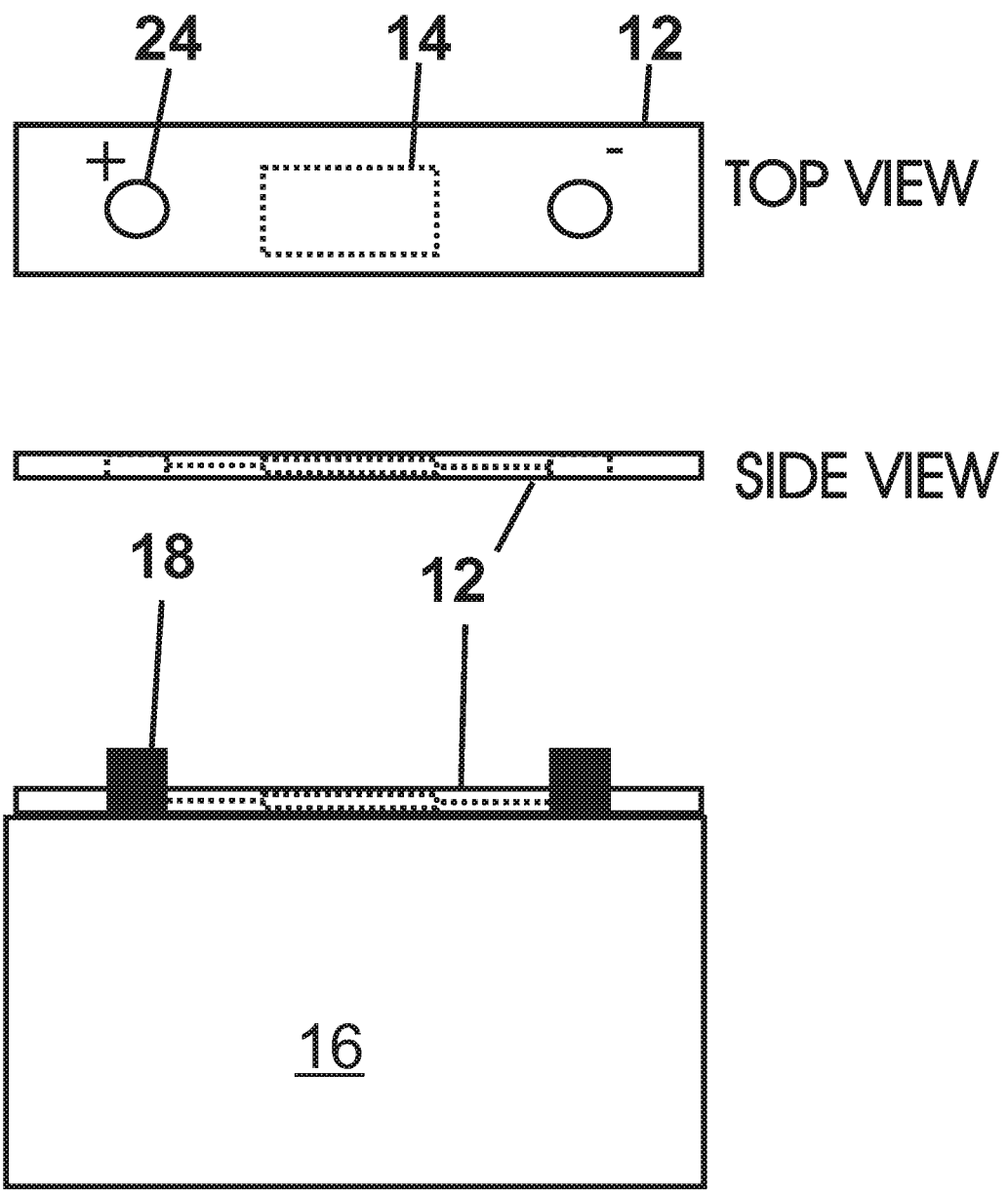
FIG. 5 shows the container for the system having an electronic section therein mounted on top of the battery.
Figure 6:
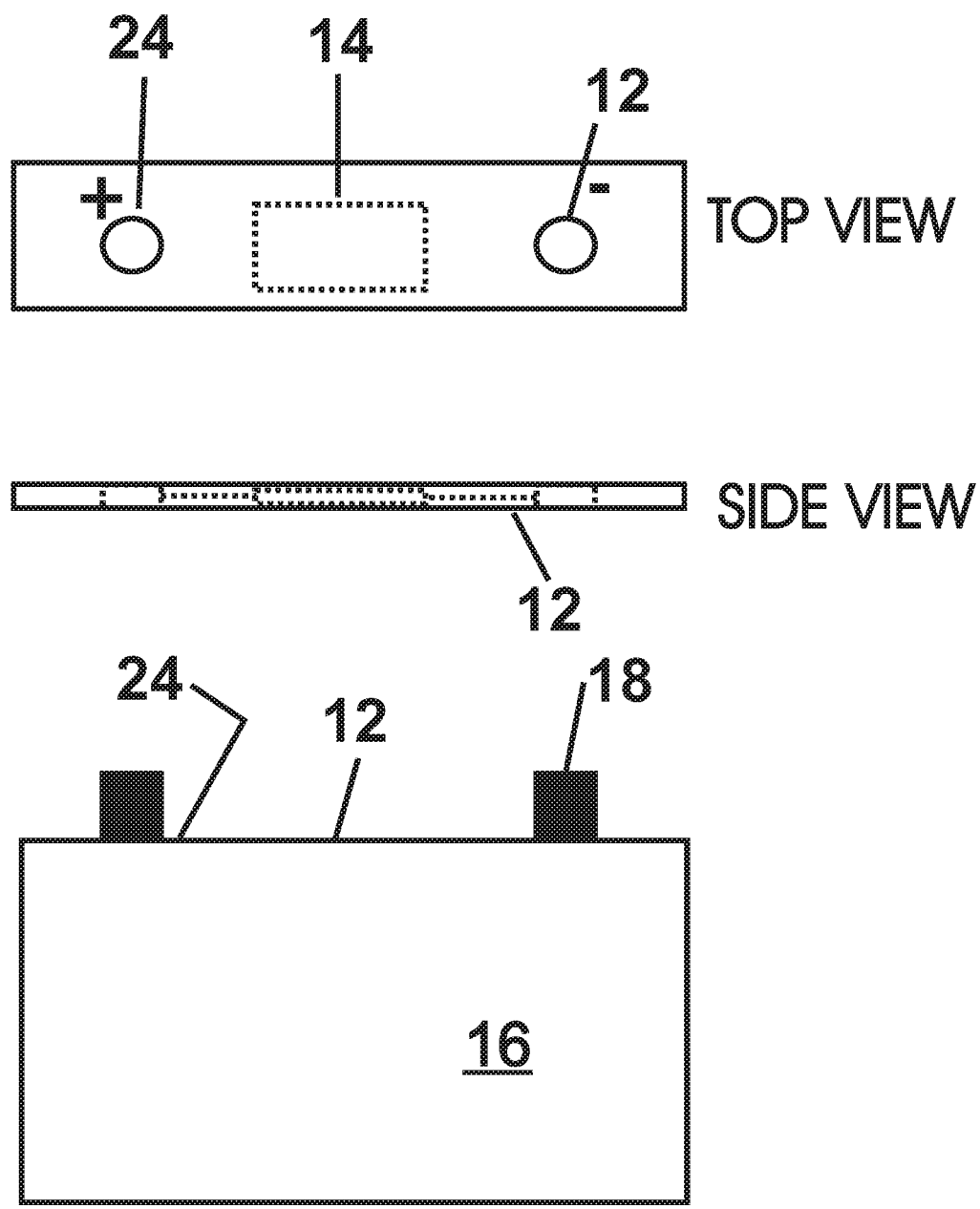
FIG. 6 shows the container with terminal mounting holes before mounting to the outside of the battery.

The present invention provides a smart battery communication system 10, FIG. 1, for various mobile devices having a sealed container 12, FIGS. 4 to 6, with an electronic section 14 for the smart battery communication system 10 mounted to a vehicle battery 16 with terminals 18, FIG. 4, for receiving power therefrom; a micro-controller 20 is mounted in the container 12 and has a microprocessor therein; one or more sensor modules 22 are in the container 12, where each sensor module 22 is capable of a specific function such as monitoring battery health; and one or more interfaces in the container connected to the controller 20 and the one or more sensor modules 22, further including one or more wireless modems 24 for communicating therefrom.

Figure 3:
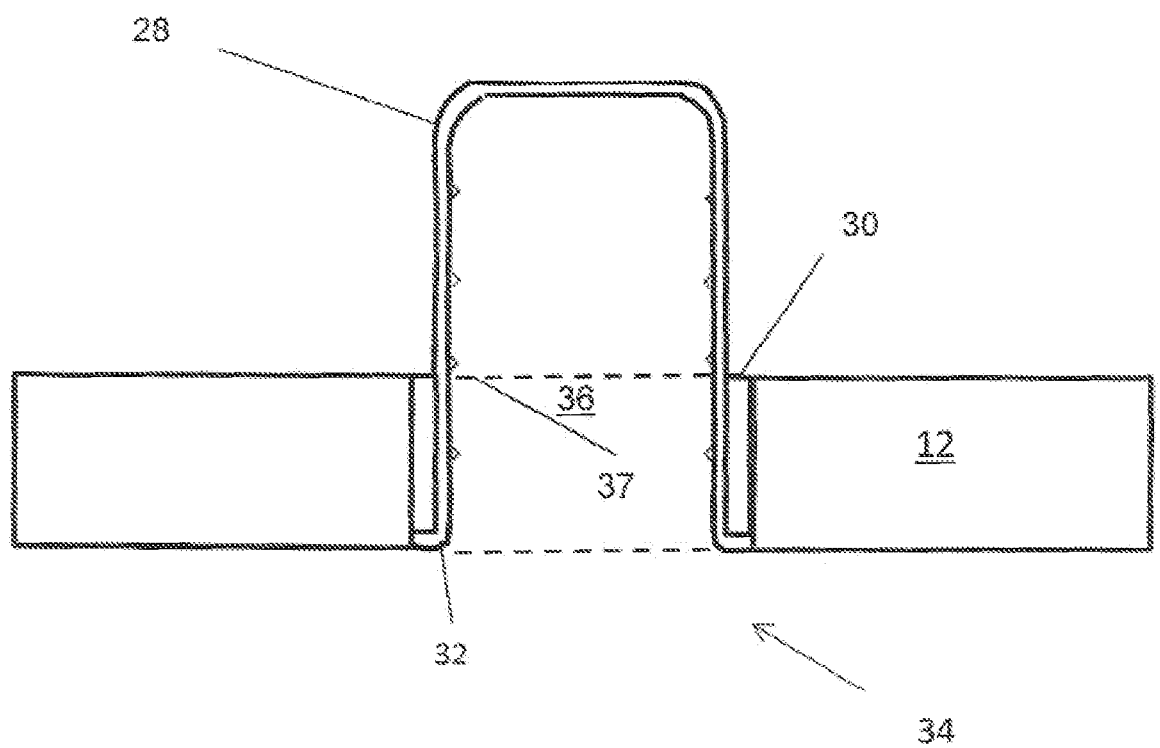
FIG. 3 shows a battery terminal mounting device for a container holding the present invention.

The container 12 may be mounted to a top of the battery or integrally formed, (see FIGS. 4 to 6). It is understood that batteries may not have the terminals on the top, but on the side and thus the connection to the container 12 would be appropriately adjusted. FIG. 5 shows the container 12 mounted on the top of the battery 16. The terminal posts 18 are placed through holes 24, FIG. 24, and held therein by a post cap 28 shown in FIG. 3. FIG. 4 shows the container 12 mounted inside of the battery 16. It should be understood that the container 12 may be mounted to the outside of the battery 16 or the inside. A standard car battery with terminals on the top will have the system 10 mounted to the top. OEM batteries may have the system mounted therein.

Figure 2:
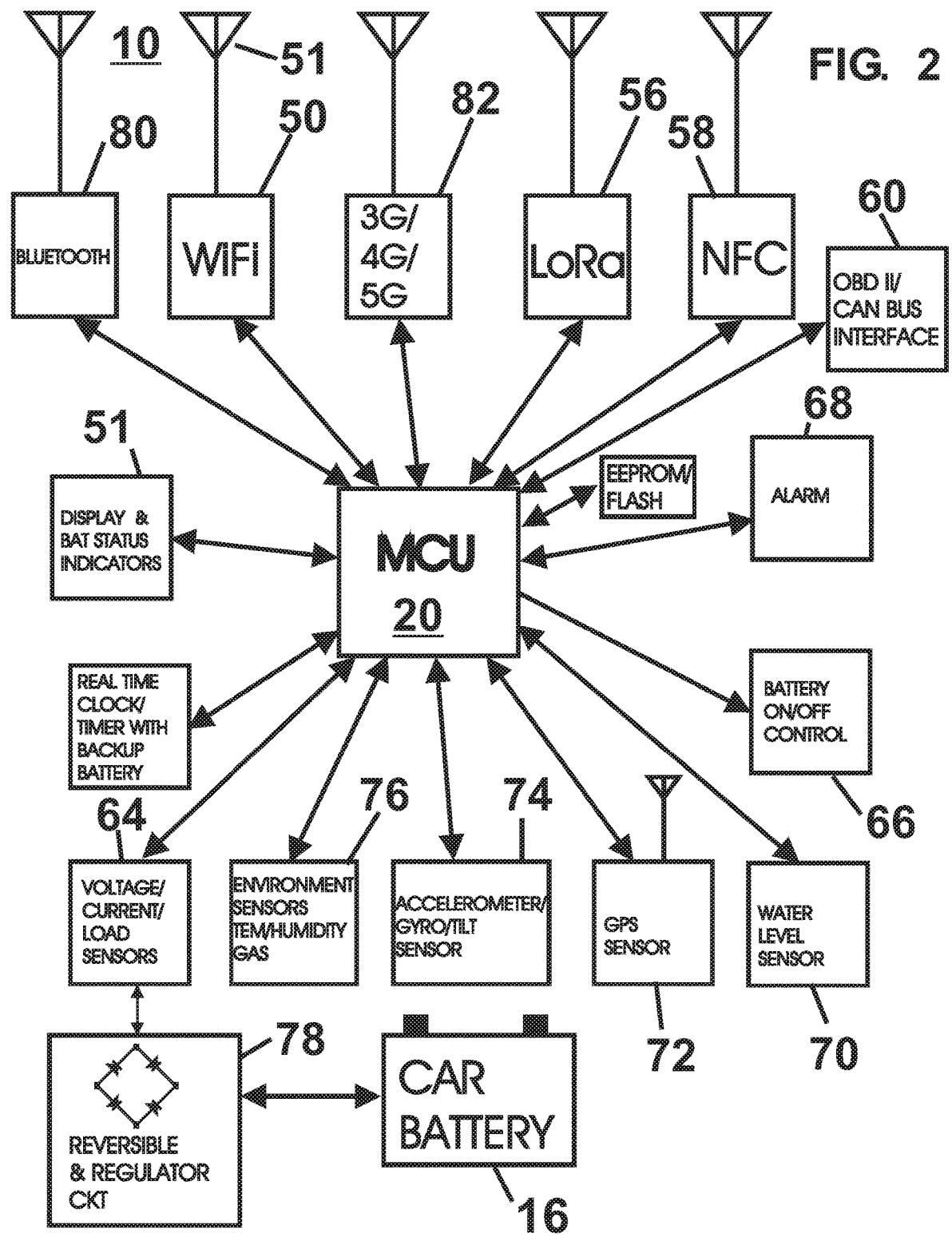
FIG. 2 is a partial schematic of the present invention showing various sensor modules.
Figure 8:
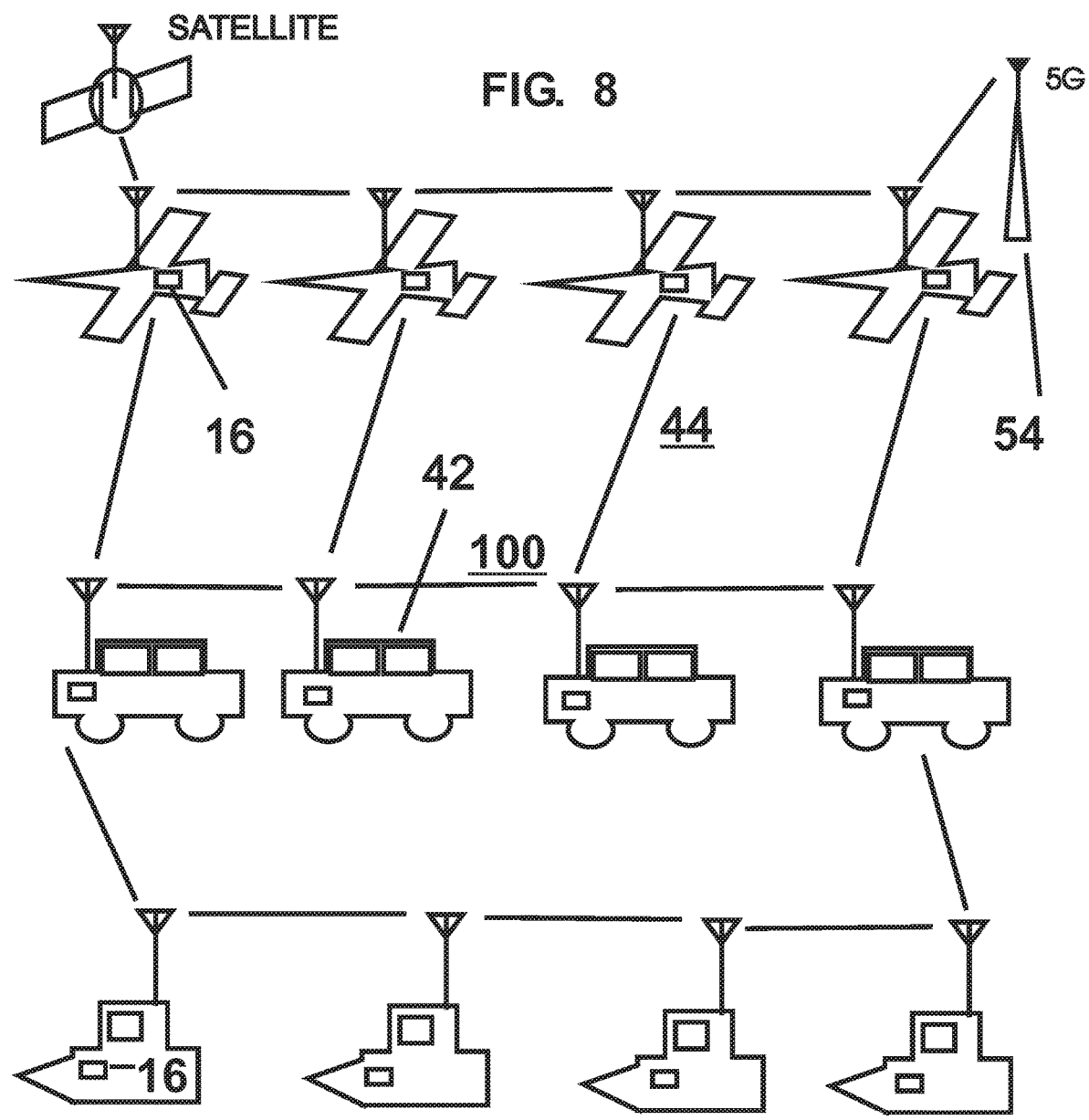
FIG. 8 shows the system being used in a network of aircraft, cars/trucks and boats for the present invention.

Referring to FIG. 1, the smart battery communication system 10 is shown in a vehicle 42, FIG. 8, having a battery 16, being like a conventional car battery with a pair of battery terminals 18. The system 10 operates wirelessly and communicates to external devices 44, FIG. 9, such as a vehicle display 50, FIG. 2, a smartphone 52, FIG. 10, a cell tower 54 and one or more sensor modules 22. The container 12 is connected to the battery terminals 18 as shown in one embodiment in FIG. 3. The terminal connection 34 may include a metal ring 30 within the terminal hole 36 and electrically connected to the container 12. A terminal cap 28 would fit within the terminal hole 36 and fit securely over the terminal post with the use of gripping teeth 37 therein. A lip 32 at the bottom of the terminal cap 28 would prevent the cap 28 removal until the container 12 is lifted therefrom. The cap 28 would further serve as an extension of the terminal post for connecting conventional battery clamps thereon due to the thickness of the container 12 when placed on top of the battery 16. When the container 12 is integrally formed in the battery, modifications thereto would make the need for such a cap 28 unnecessary. In the preferred embodiment, no external wires would be connected to the container 12 and this thus requires wireless devices therein. FIG. 2 illustrates several devices required therein such as the micro-controller unit 20 and processor with one or more wireless modems 24 and one or more sensor modules 22 such as shown. These features will be further disclosed herein.

In general, vehicle owners at times are confronted with their car not wanting to start. It can be a frustrating and possibly dangerous event depending on where it happens. When alternators are working properly a battery may not have much life left in it but the alternator warning light will not come on if the battery is about to die. Therefore most if not all vehicle owners will agree that it would be advantageous to be able to buy off the shelf a car battery that will self-diagnose and report its condition to the vehicle owner through an alert App on ones smartphone that the battery is in jeopardy of dying and leaving a motorist stranded. In the past a vehicle owner would have to drive to an auto shop and have a technician hookup terminals and test the battery. Most vehicle owners never make a habit of doing this and it's only when there is trouble and they need a jumpstart do they head to the repair shop afterwards. With the present invention this would be circumvented and alleviate the frustration and possible dangerous situations that arise from being stuck on the road with a dead battery.

The system 10 as shown in FIG. 2, has or may have within the system 10 the following capabilities embedded: (1) An antenna 51 which is connected to the WiFi router repeater 50; (2) The Bluetooth device 80 for communicating with external devices such as smartphone 52 or other Bluetooth devices, FIG. 10. A cellphone App in the smartphone 52 could get a warning message that the battery 14 is about to die and you should get it checked. (3) The WIFI router 50 with repeater capability could create a mesh network with other cars with this battery technology, see FIGS. 8 to 10. It would allow signals to repeat between vehicles in remote areas such as in certain interstates highways such as between Nevada and Utah where cell tower infrastructure is sparse. See FIGS. 8 to 10. This invention will expand the coverage of cell signals for Cell Carriers. (4) WIFI signals 82 will be 3G, 4G, 5G, and LTE capable as well as any new advancements in this technology. (5) Lora Low Power 56 wide area network will allow for communicating over long distances with low power consumption. (6) NFC-Near field communications 58 will enable the battery to communicate with a 1l smartphone app in close proximity. (7) OBDII sensor interface 60 provides a capability to allow the battery to communicate with the OBDii in the vehicle allowing the vehicle to talk to the battery to pass information regarding the battery's health status re Display & Bat Status Indicators 51, (8) Voltage/Current/Load sensors 64, and battery on/off control 66. The Car battery can also interface to the CAN Bus 60. (9) An alarm 68 can alert the owner that the car is being tampered with. (10) Battery On/Off switch can be controlled by smart phone app to keep a car from being stolen. (11) A water level sensor 70; (12) A GPS sensor 72. (13) An accelerometer Gyro tilt sensor 74; (14) environmental sensors: humidity and temperature sensors 76; (15) regulator circuitry 78 is used to reverse the posts from negative to positive and positive to negative. As some cars require the positive to be on a specific side as well as the negative. A regulator circuit 78, FIG. 7; (16) Further communicate with Onstar, LoJack, 911.

The system 10 has a MCU 20 (Micro Controller) in the container 12. See Wikipedia article, "Microcontroller" for explanation of the items thereon, such as a processor (CPU), Memory for data storage, and program memory. I/O peripherals being the input and output devices that interface for the processor to the outside world. Other supporting elements of a microcontroller include: Analog to Digital Converter (ADC) that interfaces with external analog devices, such as sensors. Digital to Analog Converter (DAC) which allows the microcontroller to communicate its outgoing signals to external analog components; System bus—The system bus is the connective wire that links all components of the microcontroller together. Serial port allows the microcontroller to connect to external components. It has a similar function to a USB or a parallel port but differs in the way it exchanges bits.

Different types of batteries are considered for the system 10 use. The conventional car battery is lead acid. Other types such as LIFEP04 technology which is The lithium iron phosphate battery (LiFePO battery) or LFP battery (lithium ferrophosphate), is a type of lithium-ion battery using lithium iron phosphate (LiFePO) as the cathode material, and a graphitic carbon electrode with a metallic backing as the anode. The energy density of LiFePO is lower than that of lithium cobalt oxide (LiCoO), and also has a lower operating voltage. The main drawback of LiFePO is its low electrical conductivity. Therefore, all the LiFePO cathodes under consideration are actually LiFePO/C (composite made with Carbon). Because of low cost, low toxicity, well-defined performance, long-term stability, etc. LiFePO is finding a number of roles in vehicle use, utility scale stationary applications, and backup power. LFP batteries are cobalt-free.

Figure 10:
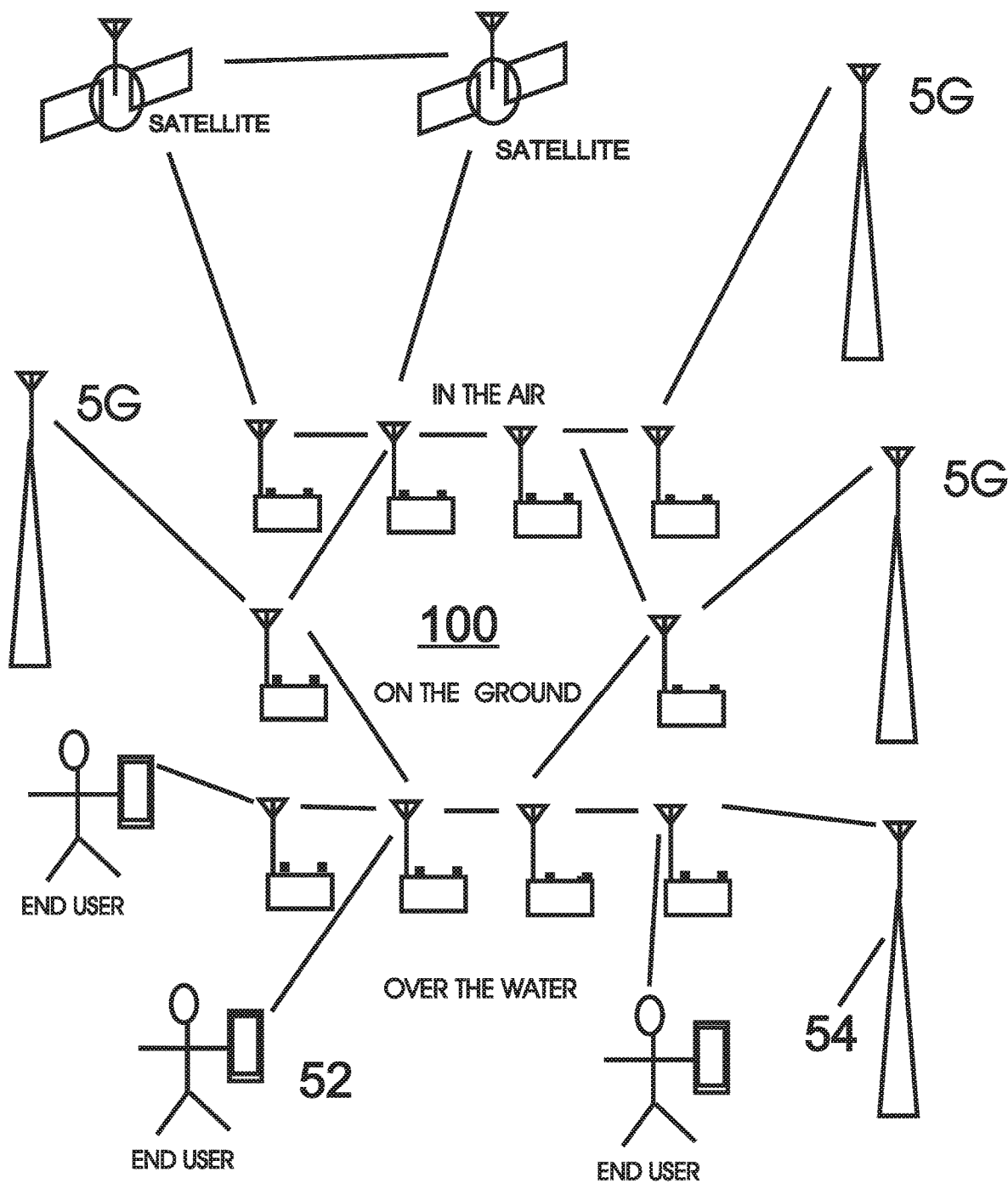
FIG. 10 shows the system being used in a network communicating with satellites, cell phone towers, and smartphones of the present invention.

FIG. 8 shows the smart batteries 16 being used on aircraft, cars/trucks and boats and being able to communicated therebetween. FIG. 9 shows a network 100 of smart batteries 16 that can communicate in the air, on the ground and over the water. FIG. 10 shows the network 100 communicating with cell towers 54, smartphones 52 and satellites.

In summary, a smart battery communication system attached to a vehicle battery comprises a container for the smart battery communication system connected to a vehicle battery and terminals for receiving power therefrom; a controller mounted in the container and having a microprocessor therein; one or more sensor modules in the container, and one or more interfaces in the container, the interfaces connecting the controller and the one or more sensor modules, further including one or more modems for communicating therefrom. The smart battery communication system is removably attached to a top of the battery or in another embodiment integrally formed therein. The container is sealed and is composed of waterproof materials. The vehicle may be a car, but more broadly covers any device having a battery therein. The smart battery communication system being capable for use with a transport vehicle such as a combustion engine vehicle, electric vehicle, hybrid vehicle, aircraft, boats, drones and orbital spacecraft.

The smart battery communication system communicates wirelessly with external devices such as another vehicle, a cell tower, a satellite and with that vehicle itself. The external devices are selected from the group including a display device in the car, a Bluetooth system, a WiFi transceiver, an Onstar system, a Lojack system, devices in other vehicles and cars, a cell tower system, and a satellite system such as GPS; and further wherein the sensor modules include a voltage/current detectors for battery cells, a microphone, a speaker, a motion detector, a proximity detector, a gas detector, a temperature humidity indicators and a GPS receiver. The battery has battery cells that are rechargeable and composed of lead acid, NiMh, lithium-ion, LiFePO4, graphene, super/ultra capacitor and/or solid-state materials. The present smart battery communication system can be used in combustion engine, hybrid, electric and any other vehicle using a battery.

The system implements a method for communicating from the vehicle having a smart battery communications system, having therein a container for the smart battery communication system and connected to a vehicle battery terminals for receiving power therefrom. The system communicates with a cell phone tower and includes signals for locating lost and/or stolen vehicles. The one or modems wirelessly relay/repeat signals and data from vehicles to vehicles and to fixed base stations. The wireless signals are in a fixed spectrum and/or spread spectrum modulated for CB, 2G, 3G, 4G, 5G cellular phone, WiFi, Bluetooth, LoRa and Zigbee. The system includes therein motion sensors that are usable for earthquake detection, vehicle theft, tampering and warning applications. The battery is typically used to start internal combustion engines of generators, cars, trucks, motorcycles, boats, aircraft and drones. The system in particular is used for monitoring the health of the battery cells remotely. The sensors can also detect crash/collision accidents: and automatically disconnecting the smart battery power and sending distress signals, and also further including the steps of disconnecting the smart battery cells to remotely disconnect to prevent unauthorized use, and further to lock/unlock vehicle doors in case of emergency.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A smart battery communication system for a vehicle battery, comprising:
   a container for said smart battery communication system connected to a vehicle battery and two terminals for receiving power therefrom;
   a micro-controller, said micro-controller mounted in said container and having a microprocessor therein;
   one or more sensor modules in said container; and
   one or more interfaces in said container, said interfaces connecting said micro-controller and said one or more sensor modules, including one or more modems for communicating therefrom to an electronic device like a smartphone having an app to display said battery conditions by wireless communications means, said communication system being able to communicate with one or more smart communication systems in vehicles.

2. The smart battery communication system for a vehicle battery as defined in claim 1 wherein said container is removably attached to said battery.

3. The smart battery communication system for a vehicle battery as defined in claim 1, wherein said container is integrally formed in said battery.

4. The smart battery communication system for a vehicle battery, wherein said system communicates wirelessly with external devices such as a smartphone or other smart battery communication system(s).

5. The smart battery communication system for a vehicle battery as defined in claim 4, wherein said external devices are selected from the group including a display device in said car, a Bluetooth system, a WiFi transceiver, an Onstar system, a Lojack system, devices in other vehicles and cars, a cell tower system, and a satellite system such as GPS.

6. The smart battery communication system for a vehicle battery as defined in claim 5, wherein said sensor modules include a voltage/current detectors for battery cells, a microphone, a speaker, a motion detector, a proximity detector, a gas detector, a temperature humidity indicators and a GPS receiver.

7. The smart battery communication system for a vehicle battery as defined in claim 1, wherein said container is made of waterproof materials.

8. The smart battery communication system for a vehicle battery as defined in claim 1, wherein said battery cells are rechargeable and composed of lead acid, NiMh, lithium-ion, LiFePO4, graphene, super/ultra capacitor and/or solid-state materials.

9. The smart battery communication system that is capable of use with a transport vehicle such as a combustion engine vehicle, electric vehicle, hybrid vehicle, aircraft, boats, drones and orbital spacecrafts.

10. A method for communicating from a vehicle having a smart battery communications system, having therein a container for said smart battery communication system and connected to a vehicle battery for receiving power therefrom; a micro-controller, said micro-controller mounted in the container and having a microprocessor therein; one or more sensor modules in the container; the sensor modules communicating with the micro-controller and one or more wireless modems; communicating to an electronic device like a smartphone having an app to display said battery conditions by wireless communications means, said method comprising the steps:
the communications system communicating with one or more smart communication systems in vehicles.

11. The method as defined in claim 10, including the steps of one or more smart battery communication systems relaying/repeating wireless signals and data from vehicles to vehicles and to fixed base stations.

12. The method as defined in claim 10, wherein smart battery communication system includes the steps of communicating from motion sensors that are usable for earthquake detection, vehicle theft, tampering and warning applications.

13. The method as defined in claim 10, further including the steps of the battery cells starting internal combustion engines of generators, cars, trucks, motorcycles, boats, aircraft and drones.

14. The method as defined in claim 10, further including the steps of monitoring the health of the battery cells remotely.

15. The method as defined in claim 10 further including the steps of detecting crash/collision accidents; and automatically disconnecting the smart battery power and sending distress signals.

16. The method as defined in claim 10 further including the steps of disconnecting the smart battery cells to remotely disconnect to prevent unauthorized use.

17. The method as defined in claim 10, further including the steps of the modem receiving signals to lock/unlock vehicle doors in case of emergency.

18. A smart battery communication system, said smart battery communication system comprising a router and a WiFi repeater contained in a battery capable of communicating and routing and repeating WiFi signals to other smart battery communication systems in vehicles which includes cars, trucks, airplanes, boats, or spacecraft and that also receive and repeats WiFi signals from cell towers, and satellites creating a mesh network with no single point of failure.

* * * * *